Oct. 1, 1963    G. J. FRIEDMAN ETAL    3,105,382
HIGH ALTITUDE TRANSDUCERS
Filed Dec. 30, 1960    3 Sheets-Sheet 1
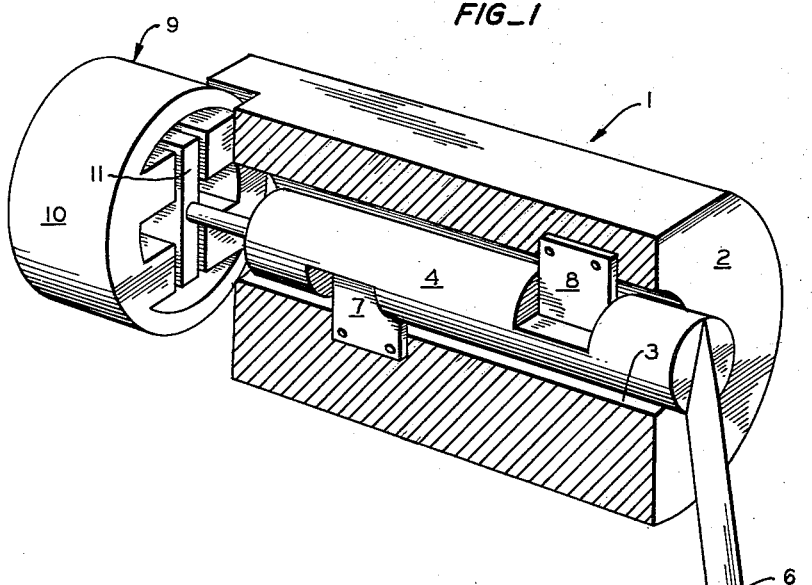
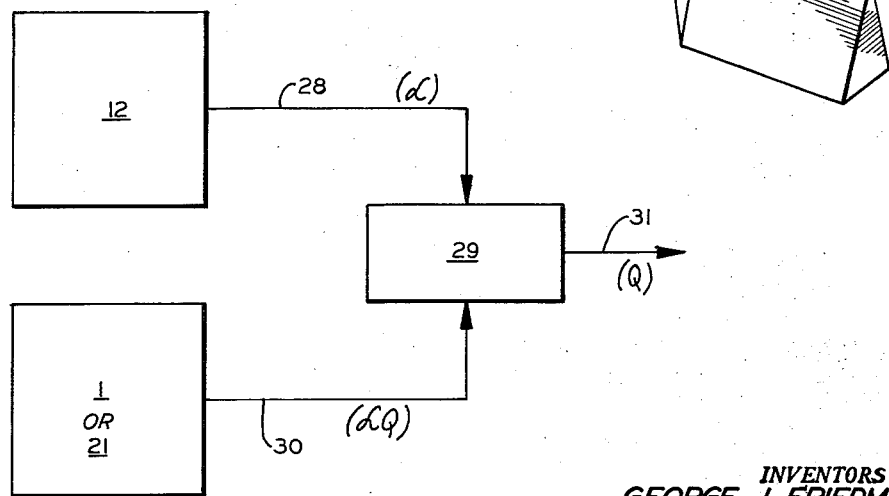
INVENTORS
GEORGE J. FRIEDMAN
LOUIS A. deBOTTARI
BY
ATTORNEY

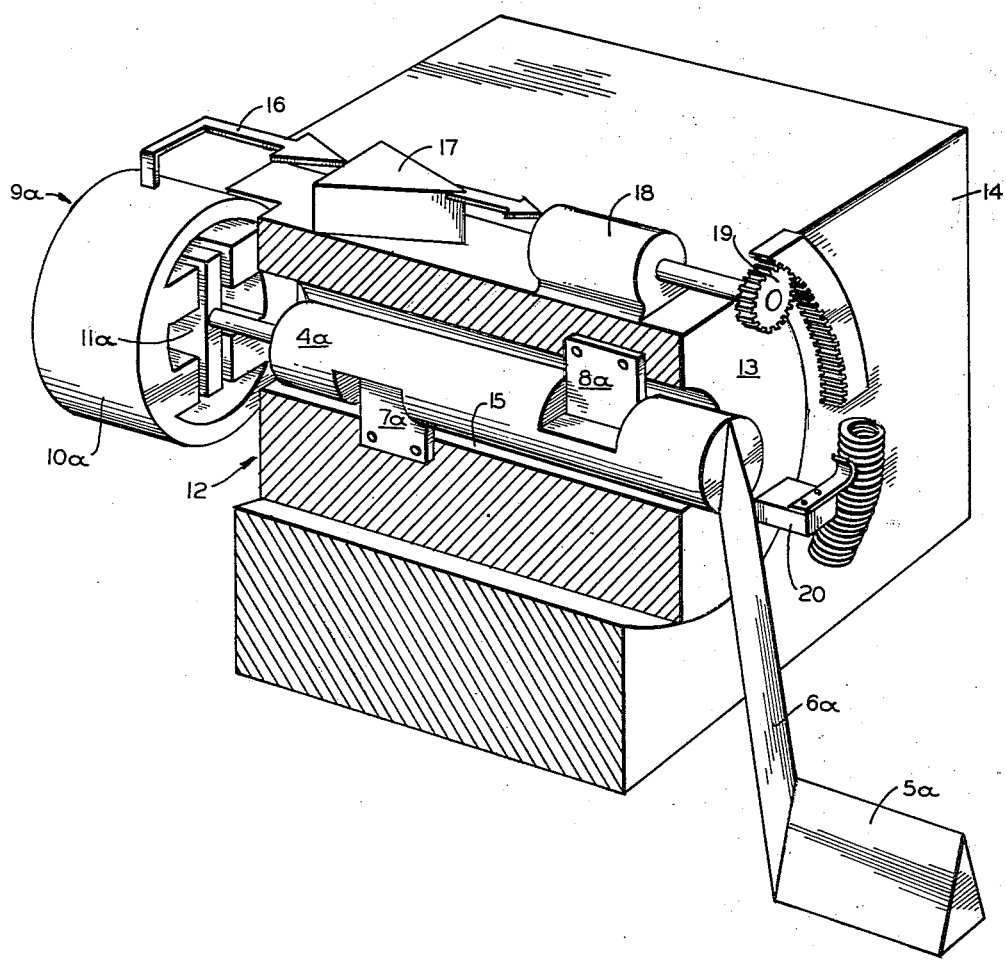

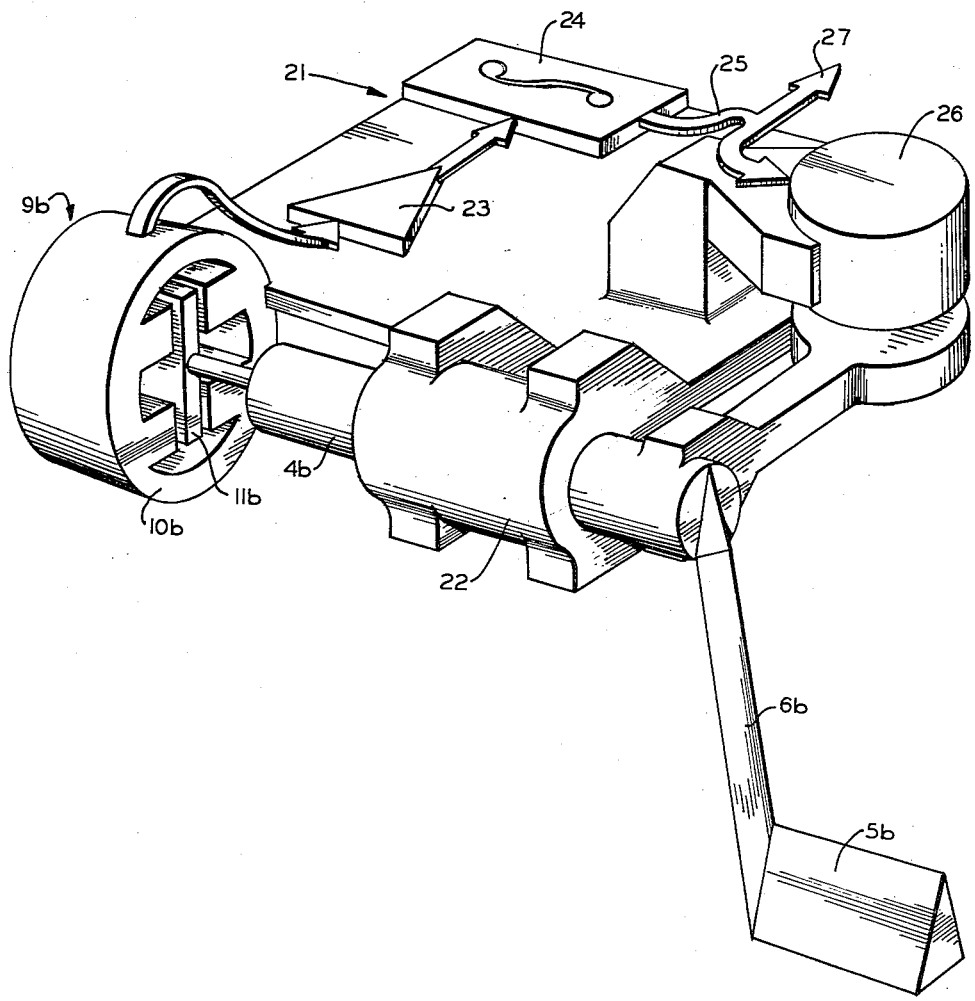

United States Patent Office 3,105,382
Patented Oct. 1, 1963

3,105,382
HIGH ALTITUDE TRANSDUCERS
George J. Friedman, Hawthorne, and Louis A. de Bottari, Torrance, Calif., assignors to Servomechanisms, Inc., Hawthorne, Calif., a corporation of New York
Filed Dec. 30, 1960, Ser. No. 79,746
2 Claims. (Cl. 73—180)

This invention relates generally to high altitude transducers and more particularly to transducers for deriving accurate signals corresponding to characteristics of an airstream relative to a vehicle moving at extremely high altitudes, for example within the range of 100,000 to 1,000,000 feet.

One frequently used characteristic of such an airstream is the angle of attack defined in this description as the angle between a given reference plane passing through the longitudinal axis of a vehicle moving through the atmosphere and the direction of the airstream flowing past the vehicle. Heretofore, vane type sensor devices have been the most reliable means employed to measure the angle of attack of aircraft moving at low altitudes such as the instrument described in United States Letters Patent No. 2,699,065 issued to W. E. Blair on January 11, 1955. However, the aerodynamic forces available in the rarified atmosphere at extremely high altitudes are so small, even at high vehicle velocities, that friction in the bearings and moving parts of these prior art devices has caused insensitive and inaccurate instrumentation. Moreover, differential pressure and inertial type devices, also used for measurement of the angle of attack at low altitudes, have been insensitive, inaccurate and unreliable at the extremely high altitudes contemplated in this description. Differential pressure type units also have prohibitively long dynamic response characteristics at these altitudes.

Therefore, it is one object of the present invention to provide an angle of attack transducer which is sensitive, reliable and accurate at extremely high altitudes while at the same time is rugged enough to withstand drag forces normally encountered at sea level.

Another object of the present invention is to provide a sensitive angle of attack transducer for use at extremely high altitudes employing vane type sensor means in combination with other elements producing no frictional resistance to restrict movement of the vane sensor.

A further object of the present invention is to provide a flexible instrument for deriving signals corresponding to related characteristics of an airstream such as the aerodynamic torque exerted on a vehicle by its airstream or the aerodynamic ram pressure of the airstream, as well as for deriving signals proportional to the angle of attack itself.

The foregoing and other objects of this invention will become apparent to those skilled in this art upon an understanding of the following description considered in conjunction with the accompanying drawings and the appended claims. The invention is illustrated in a preferred embodiment in the drawings wherein:

FIG. 1 is a schematic perspective view of an instrument embodying features of the present invention for deriving an output signal corresponding to the aerodynamic torque exerted on a vehicle by its airstream;

FIG. 2 is a schematic perspective diagram of an angle of attack transducer embodying features of the present invention;

FIG. 3 is a schematic perspective view of a force-balance instrument for deriving an output signal corresponding to the aerodynamic torque exerted on a vehicle by its airstream; and FIG. 4 is a block diagram illustrating instruments of FIG. 1 or FIG. 3, combined with the device of FIG. 2 to produce an output signal proportional to the aerodynamic ram pressure of the airstream.

FIG. 1 illustrates a vane type transducer, referred to generally as 1, arranged to produce an output signal corresponding to the aerodynamic torque exerted on a moving vehicle by its airstream. The instrument case 2, is rigidly secured to the vehicle and is pierced by a central bore 3. The axis of this bore is oriented transversely with respect to the longitudinal axis of the vehicle. Bore 3 concentrically embraces a rotatable shaft 4 which is rotated by aerodynamic forces acting upon a sensor vane 5 secured to one end of shaft 4 by an arm 6 extending outward radially from the axis of the shaft. Sensor vane 5 projects into the airstream of the carrying vehicle and normally aligns itself with the airstream moving past the vehicle.

The foregoing elements will be familiar to those skilled in this art and are used in low altitude angle of attack instruments of the type described in the foregoing United States Letters Patent No. 2,699,065 issued to W. E. Blair.

The present invention eliminates all sources of friction which hinder movement of the sensor vane 5 thereby producing a transducer which is sensitive to the minute forces available in an airstream at extremely high altitudes. It will be observed in FIG. 1 that a pair of diametrically opposed flexure members 7 and 8, respectively, interconnect shaft 4 with the instrument case 2. These flexure members replace ball bearings presently used in low altitude transducer designs and eliminate all frictional resistance to the rotation of the shaft 4. Aerodynamic forces acting upon vane 5 are resisted by bending moment developed in the two flexure members 7 and 8 which are mounted so that their bending axes lie in the same plane.

Angular displacement of vane 5 relative to the case 2 caused by the motivating airstream is detected by an output signal means 9 which itself produces no frictional resistance to rotation of shaft 4. An example of such an output signals means or pick-off means in the form of a reluctance bridge is illustrated in FIG. 1; however, other frictionless pick-off means familiar to those skilled in this art are also applicable. The pick-off means illustrated comprises a four pole reluctance bridge which operates through the interaction of electromagnetic fields and produces no friction whatsoever. A normally balanced induction bridge 10 is secured to the vehicle and is wired so that it is sensitive only to rotational movements of a pivotable armature 11. The armature 11 is secured to shaft 4 and is rotatable therewith within the magnetic field of the bridge 10.

Pick-off means of this type is illustrated in United States Letters Patent No. 2,699,065 to which reference previously has been made. The windings of the pick-off means are connected as a normally balanced induction bridge across a suitable A.-C. power source. Angular movement of the armature corresponding to the vane displacement varies the inductance of these windings causing an imbalance in the bridge. An output signal is produced as a result of this imbalance. The signal varies in magnitude and phase as a function of the bridge imbalance and ceases altogether when the vane is not angularly displaced relative to the vehicle reference and the bridge is again balanced.

Damping means not illustrated herein, but familiar to those skilled in the art, are provided for shaft 4 to prevent oscillation or hunting. Magnetic damping means is preferred as it does not introduce friction forces restricting motion of the shaft.

As the airstream displaces vane 5 the resultant torque exerted upon shaft 4 is resisted by the spring-like constraint of deflecting flexure members 7 and 8 with an equal and opposite torque. The total angular displacement of the vane is proportional to the aerodynamic torque required to move the vane, and, hence, the aerodynamic torque exerted by the airstream on the vehicle itself. This torque corresponds closely to the product of the angle of attack and the ram pressure (the difference between the total pressure and the static pressure) of the airstream. For vehicle stability control purposes this data is more valuable than the angle of attack alone since it reveals directly the torque for which compensation must be made in order to stabilize vehicle movement.

The flexure members are extremely thin in order to provide sensitive response at the tiny pressures encountered at the high altitudes contemplated herein and yet are sufficiently strong to resist vane drag forces encountered at sea level. For example, flexure members fabricated from Phosphor-bronze or beryllium-copper instrument alloys in the range of from 0.005 to 0.050 inch thick are satisfactory for most conditions contemplated herein. Movement other than angular motion of shaft 4 is controlled by appropriate mechanical stops placed within the bore 3 between shaft 4 and the instrument case 2.

FIG. 2 illustrates a null-balance transducer combining features illustrated in FIG. 1 with a servo-motor follow-up system to rotate the instrument case in controlled relation to vane displacement so that the output of the transducer is directly proportional to the angle of attack of the vehicle relative to its airstream. The instrument, referred to generally as 12, is provided with a hub 13 which is similar to the instrument case 2 of FIG. 1. The hub 13 is rotatably mounted on the vehicle, indicated as 14 in FIG. 2 and is oriented transversely with respect to the longitudinal axis of the vehicle. The hub has a central bore 15 concentric with its axis of rotation. Within the bore 15 is a rotatable shaft 4a having a radially extending arm 6a to which is secured sensor vane 5a. Frictionless flexure members 7a, 8a, of the type described in connection with FIG. 1, are connected between hub 13 and shaft 4a and function as described previously herein.

A frictionless pick-off means 9a at the end of shaft 4a detects the angular displacement of the vane 5a and shaft 4a with respect to hub 13 and forms part of a servo-motor follow-up system. By way of example, a four pole reluctance bridge pick-off means 9a is illustrated in FIG. 2 also. The bridge itself 10a is secured to hub 13 whereas shaft 4a carries armature 11a which is rotatable with the shaft and is disposed within the magnetic field of bridge 10a. Angular movement of the armature varies the bridge inductance producing an output signal varying in magnitude and phase in relation to the displacement of the vane relative to hub 13. Damping means similar to that described in connection with FIG. 1 is provided to prevent oscillation of the shaft 4a.

There is no output signal from the reluctance bridge when the bridge is in balance. However, as the vane becomes displaced relative to hub 13, the normally balanced reluctance bridge 9a produces an output signal corresponding to the displacement. This output is supplied as an error signal 16 to other components of the servo-motor follow-up system including a high-gain amplifier 17 which in turn provides power to a servo-motor 18. The servo-motor is mounted on hub 13 and is geared to the vehicle as at 19. When servo-motor 18 is energized, the hub, flexures and servo-motor follow-up system rotate relative to vehicle 14. This rotation causes a realignment of sensor vane 5a with the airstream and a consequent change in the pick-off error signal. The follow-up system continues to adjust the position of the hub 13 relative to the vehicle until the pick-off error signal is reduced to zero. In this nulled position vane 5a is aligned with the airstream and the angle of attack is read directly as the total angular displacement of hub 13 with respect to the vehicle 14. For this purpose output means, for example a precision output potentiometer 20 of the type described in United States Letters Patent No. 2,699,065 issued to Blair, is cooperatively mounted on the hub 13 and adjacent vehicle reference 14.

The friction inherent in hub 13 rotating relative to the vehicle 14 and in potentiometer 20 causes no difficulty, since the necessary power to overcome this friction is provided by the amplifier 17. The important informational path from sensor vane 5a through 4a to output means 9a is friction free.

The force-balance transducer of FIG. 3 referred to generally as 21, also produces an output current proportional to the aerodynamic torque exerted on a moving vehicle by its airstream. The instrument includes a rotatable shaft 4b mounted transversely with respect to the longitudinal axis of the vehicle. In the illustrated embodiment shaft 4b is supported in a frictionless gas bearing 22 affixed to the vehicle. Such bearings are well-known to those skilled in this art wherein the shaft 4b and the embracing bearing lining are separated entirely by a gaseous film rather than the usual viscous oil film. Other substantially frictionless supporting means are also applicable such as the flexure-type stabilizing members described in connection with FIG. 1 and FIG. 2.

A sensor vane 5b is secured to one end of shaft 4b by an arm 6b extending outwardly radially from the axis of the shaft. Vane 5b projects into the airstream of the carrying vehicle and is normally brought into alignment with the direction of the airstream by aerodynamic forces acting upon it as described in connection with FIG. 1. The force-balance transducer of FIG. 3 also eliminates all sources of friction which hinder movement of shaft 4b and sensor vane 5b, such as ball bearings and the like, thereby producing an instrument which is sensitive to the minute forces available in an airstream at extremely high altitudes.

Angular displacement of shaft 4b and vane 5b relative to the vehicle, caused by the motivating airstream is detected by frictionless pick-off means 9b associated with shaft 4b. A signal developed therein is supplied as an error signal to means for applying torque to shaft 4b to balance torque developed in the shaft by vane 5b. Pick-off means 9b also is illustrated in FIG. 3 in the form of a reluctance bridge. However, other frictionless devices are applicable.

A normally balanced four pole induction bridge 10b secured to the vehicle is wired so that it is sensitive only to rotational movements of an armature 11b mounted on shaft 4b and rotatable therewith within the magnetic field of the induction bridge 10b. Angular movement of the armature 11b corresponding to the vane displacement varies the inductance of these windings causing an imbalance in the bridge. An output signal is produced as a result of this imbalance varying in magnitude and phase as a function of the imbalance. The signal ceases altogether when the bridge is again balanced.

Damping means also are provided to prevent oscillation or hunting and magnetic damping means is preferred as it does not introduce friction forces restricting motion of the shaft.

The signal produced by pick-off means 9b is supplied as an error signal to a high-gain amplifier 23, the output of which is supplied to an integrating circuit means 24. The integrating circuit means furnishes an output current 25 to actuate a magnetic forcing means 26 which applies a counter torque to shaft 4b opposing torque developed in the shaft by sensor vane 5b. The counter-torque is applied to shaft 4b until it equals the torque developed in the shaft by the airstream acting upon sensor vane 5b, and in so doing, the error signal is then reduced to zero.

The output of the instrument appears as the output current 25 of integrating circuit means 24 as at 27 and physically is the magnitude of that current. The current corresponds to the amount of counter torque required to balance torque developed in shaft 4b by aerodynamic forces acting upon sensor vane 5b and, hence, current 27 is proportional to the aerodynamic torque exerted upon the vehicle by its airstream.

The block diagram of FIG. 4 illustrates the use of the transducers of FIG. 1 or 3 combined with the transducer of FIG. 2 and with dividing circuit means to produce an output signal proportional to the aerodynamic ram pressure of an airstream developed by a vehicle moving at high altitudes. The output 28 of a transducer 12 of the type illustrated in FIG. 2 is supplied to a dividing circuit means represented by block 29 and corresponds to the angle of attack ($\alpha$) of the vehicle relative to its airstream. A transducer 1 of the type illustrated in FIG. 1 or a force-balance transducer 21 of the type disclosed in connection with FIG. 3 produces an output signal 30 corresponding to the aerodynamic torque or the product of the angle of attack times the aerodynamic ram pressure (Q) of the airstream. The signal 30 is divided by signal 28 in the dividing circuit means 29 to produce an output 31 proportional only to the aerodynamic ram pressure (Q).

The foregoing detailed description has been given for clearness of understanding only and no unnecessary limitations should be understood therefrom, for modifications will be apparent to those skilled in this art. The present invention is defined by the appended claims.

We claim:

1. An instrument for deriving a signal proportional to the aerodynamic ram pressure of an airstream including an angle of attack transducer deriving a first signal corresponding to the angle of attack of a vehicle relative to said airstream; a transducer deriving a second signal corresponding to the aerodynamic torque exerted on said vehicle by said airstream; and dividing circuit means for producing an output signal proportional to the quotient of said second signal divided by said first signal.

2. A force-balance transducer for deriving a signal proportional to the aerodynamic torque exerted on a vehicle by an airstream including a rotatable shaft having an axis of rotation transverse to the longitudinal axis of said vehicle; frictionless supporting means for said shaft; a sensor vane projecting radially from said shaft into said airstream; means for applying a counter torque to said shaft equal to and opposite any torque developed in said shaft by said sensor vane comprising a normally balanced reluctance bridge carried on said vehicle, an armature carried on said shaft and pivotable therewith within the magnetic field of said bridge, an amplifier energized by imbalance in said bridge, circuit means for integrating the output of said amplifier, and magnetic forcing means interconnected to said shaft and actuated by the output of said circuit means for applying to said shaft a balancing counter torque proportional to the aerodynamic torque exerted on said shaft by said sensor vane; and output signal means for producing a signal proportional to the amount of said counter torque.

References Cited in the file of this patent

UNITED STATES PATENTS

| | | |
|---|---|---|
| 2,699,065 | Blair | Jan. 11, 1955 |
| 2,855,779 | Zaid | Oct. 14, 1958 |
| 2,918,817 | Hughes et al. | Dec. 29, 1959 |